United States Patent [19]
Müller et al.

[11] Patent Number: 5,090,494
[45] Date of Patent: Feb. 25, 1992

[54] BALANCE WITH PARALLEL GUIDE ROD GUIDANCE

[75] Inventors: Rudolf Müller, Bovenden; Peter Fleischer; Veronika Martens, both of Göttingen, all of Fed. Rep. of Germany

[73] Assignee: Sartorius AG, Göttingen, Fed. Rep. of Germany

[21] Appl. No.: 552,032

[22] Filed: Jul. 13, 1990

[30] Foreign Application Priority Data

Jul. 19, 1989 [DE] Fed. Rep. of Germany ....... 3923808

[51] Int. Cl.⁵ ..................... G01G 3/08; G01G 21/24
[52] U.S. Cl. ..................... 177/229; 177/255
[58] Field of Search .................. 177/229, 255; 73/862.65

[56] References Cited

U.S. PATENT DOCUMENTS

| | | | |
|---|---|---|---|
| 4,450,922 | 5/1984 | Alexandre | 177/229 X |
| 4,454,770 | 6/1984 | Kistler | 177/229 X |
| 4,505,345 | 3/1985 | Jetter | 177/229 X |
| 4,697,658 | 10/1987 | Scheffer et al. | 177/229 |
| 4,799,561 | 1/1989 | Komoto | 177/229 |
| 4,813,505 | 3/1989 | Sodler et al. | 177/229 X |

*Primary Examiner*—George H. Miller, Jr.
*Attorney, Agent, or Firm*—Eric P. Schellin

[57] ABSTRACT

A balance with a system carrier (1) fixed to the housing and with a balance-scale support part (2) connected by two upper and two lower guide rod struts in the form of a parallel guide to the system carrier. Each upper guide rod strut is connected to a lower guide rod strut via two connection areas, which struts are combined to a guide rod plate (5,6). The two guide rod plates (5,6) are fastened laterally to the system carrier (1) and to the balance-scale support part (2). The system carrier (1) is wider than the balance-scale support part (2). The two screw attachment surfaces for the guide rod plates (5,6) on the system carrier (1) and on the balance-scale support part (2) form an angle with one another so that the system carrier (1), the two guide rod plates (5,6) and the balance-scale support part (2) form a trapezoid when viewed from the top.

5 Claims, 3 Drawing Sheets

BALANCE WITH PARALLEL GUIDE ROD GUIDANCE

BACKGROUND OF THE INVENTION

The invention relates to a balance with a system carrier fixed to the housing and with a balance-scale support part connected by two upper and two lower guide rod struts in the form of a parallel guide to the system carrier, whereby each upper guide rod strut is connected to a lower guide rod strut via two connection areas, which struts are combined to a guide rod plate. The two guide rod plates are fastened laterally to the system carrier and to the balance-scale support part.

A balance of this type is known from U.S. Pat. No. 4,799,561. In this patent, the system carrier and the balance-scale support part are equally wide, so that the guide rod plates which are screwed on laterally are parallel to each other. Moreover, the two guide rod plates are connected to one another in the central area of the guide rod struts via a spacing piece. However, this has the result that in the case of slight differences in the width of a system carrier, balance-scale support part and spacing pieces, the laterally screwed-on guided rod plates are distorted, which impairs the reproducibility of the results. The requirements put on the width tolerances are especially high thereby since the differences in width must be bridged particularly in the critical area of the diminished areas of the guide rods and within a relatively small distance between system carrier and spacing piece and between balance-scale support part and spacing piece. However, this partially cancels out the actual advantage of this design with laterally screwed-on guide rod plates, namely, that only the two guide rod plates determine the quality of the parallel guide and that tolerances part. However, the spacing pieces in the central area of the guide rods can also not simply be omitted, since the stability of the parallel guide vis-a-vis lateral forces on the balance scale becomes too low without them.

SUMMARY OF THE INVENTION

The invention therefore is concerned with indicating a design for a balance of the initially mentioned type which does not exhibit the mentioned disadvantages and, in particular, therefore can do without the spacing pieces in the central area of the guide rod struts.

The invention achieves this in that the system carrier is designed to be wider than the balance-scale support part and that the two screw attachment surfaces for the two guide rod plates on the system carrier and on the balance-scale support part form an angle with one another so that the system carrier, the two guide rod plates and the balance-scale support part form a trapezoid when viewed from the top.

The trapezoidal form results in a geometric stiffening since lateral forces on the balance scale are deflected by means of forces of pressure and traction in the guide rod struts and do not result in a bending stress. This means that the stiffening action of the spacing pieces between the guide rod struts can be eliminated and the tolerances in the width of system carrier and balance-scale support part can be compensated in the relatively large distance between system carrier and balance-scale support part.

BRIEF DESCRIPTION OF THE DRAWINGS

The invention is described in the following with reference made to the schematic Figures.

DETAILED DESCRIPTION OF THE INVENTION

Figure 1:
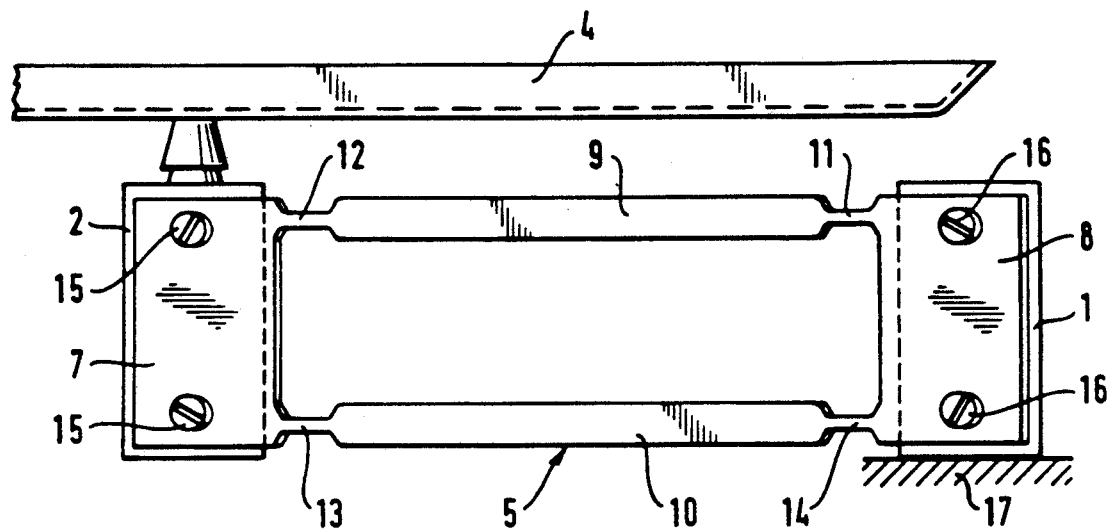
FIG. 1 shows a side view of the balance of the invention.
Figure 2:
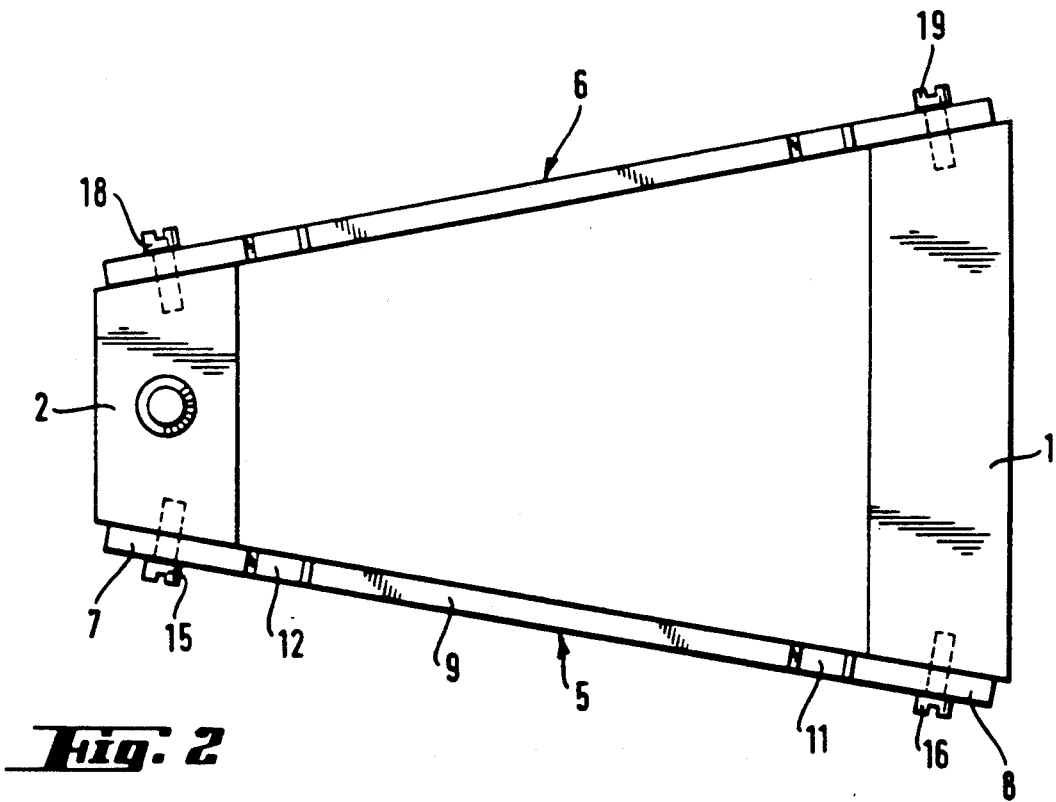
FIG. 2 shows a top view of the balance of FIG. 1.

The parts of the balance essential for the invention are shown in FIG. 1 in a side view and in FIG. 2 in a top view. System carrier 1 is fastened to a part 17 of the balance housing which is shown only in FIG. 1. Balance-scale support part 2 is connected to system carrier 1 via a parallel guide consisting of the two guide rod parts 5,6. Guide rod part 5 consists of an upper guide rod strut 11/9/12, of a lower guide rod strut 14/10/13, of a connecting area 8 on the side of system carrier 1 and of a connecting area 7 on the side of balance-scale support part 2. Guide rod part 6 is designed in a corresponding manner. The two upper guide rod struts and the two lower guide rod struts form the parallel guide, whereby thin areas 11,12,13,14 form the bending articulations. Guide rod 5 is fastened with screws 16 laterally to system carrier 1 and with screws 15 laterally to balance-scale support part 2. System carrier 1 is wider than balance-scale support part 2 and both comprise oblique side surfaces. The dimensioning is selected in such a manner that a level screw attachment surface results for both guide rod plates. Any tolerances of measurement and angle are not so critical, since they can be compensated over a relatively large distance on account of the great distance of balance-scale support part 2 from system carrier 1 and thus results in only very small distortions. The trapezoidal form results in a distinct stabilizing of the parallel guide vis-a-vis lateral or horizontal forces on balance scale 4. These forces acting upward or downward in FIG. 2 in the plane of the drawing are converted by the trapezoidal form into forces of traction and pressure in guide rod plates 5 and 6 and are thus deflected safely to system carrier 1.

The remaining parts of the balance are believed generally known in their design and function. For example, balance-scale support part 2 can be connected to the coil of an electromagnetic compensation of force as is shown in DE-PS 30 02 462.

On the other hand, balance-scale support part 2 is connected via a coupling element to a translation lever which carries the coil of an electromagnetic compensation of force as is shown in utility models DE-GM 81 37 825 and DE-GM 84 09 630. The coupling element can also be combined with the spring bearing for the translation lever, as is shown in DE-OS 38 38 906. The electronic components for the electromagnetic compensation of force are likewise generally known and described e.g. in already-cited DE-PS 30 02 462 or DE-OS 38 38 906.

Instead of the electromagnetic compensation of force, which is preferably to be used, any other low-travel measured value receiver is naturally also possible such as e.g. an oscillating string or an oscillating quartz or an optical measured value receiver.

The two guide rod plates 5,6 can be punched, milled in a work step or advantageously electronically eroded. As a result thereof, the two guide rod plates can be manufactured with very slight differences without the expense becoming too great. Since the vertical spacing of the moving joints (in FIG. 1 the spacing of thin areas 11,14 as well as of thin areas 12,13) does not change during the mounting of guide rod plates 5,6 no additional errors will arise from the mounting.

Figure 3:
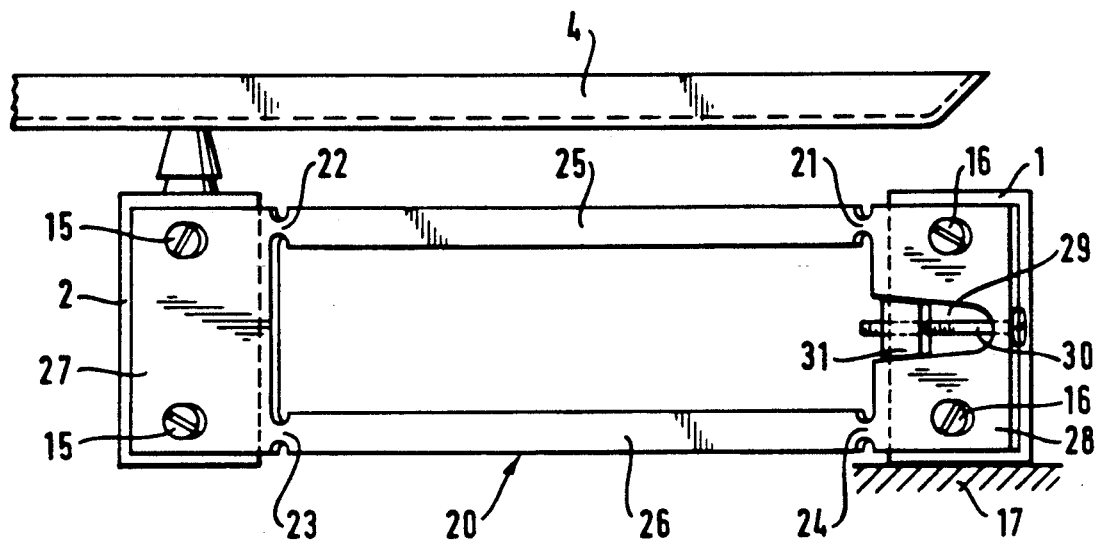
FIG. 3 shows a side view of the balance in a second embodiment.

The second embodiment shown by FIG. 3 in a side view differs from the first embodiment by a differently shaped guide rod plate 20. Thin areas 21,22,23,24 merge gradually into the thicker central part 25 and 26 and into connecting areas 27 and 28.

Moreover, connecting area 28 on system carrier 1 comprises horizontal slot 29. This slot 29 can, as shown in FIG. 3, terminate in connection area 28; however, it can also run through and divide connecting area 28 into an upper and a lower part. Slot 29 is somewhat conical (shown in an exaggerated manner in FIG. 3 for the sake of clarity) and the slot can be slightly widened by means of shifting a block 31 by means of a screw 30, which adjusts the exact parallelism of upper guide rod strut 21/25/22 and of lower guide rod strut 24/26/23. After the adjustment process, lower fastening screw 16 is tightened, which fixes the adjusted state.

The adjusting of the exact parallelism of the upper and lower guide rod struts, and therewith the fine adjustment of the corner-load freedom or mobility of the balance, can take place not only in the manner just described. The vertical spacing of the thin areas can also be somewhat varied by a slight removal of material in the area of thin areas 11,12,13,14 and 21,22,23,24. In addition, it is also possible to do without the fine adjustment and to carry out the corner load freedom by means of a so-called corner-load sensor by means of mathematical correction in the electronic circuitry, as is known e.g. from DE-PS 30 03 862. It is advantageous to select the vertical spacing of thin areas 11,14 and 21,24 on the side of system carrier 1 to be somewhat greater than the vertical spacing of thin areas 12,13 and 22,23 on the side of balance-scale support part 2. This reduces the deviation from the optimum adjustment of the corner load freedom right from the beginning.

Figure 4:
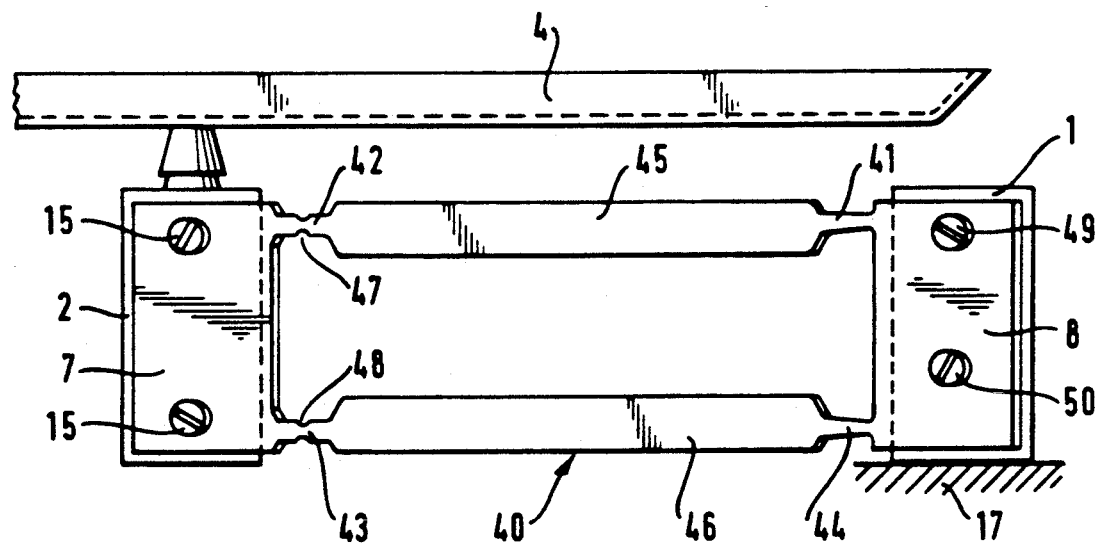
FIG. 4 shows a side view of the balance in a third embodiment.

The third embodiment, shown in FIG. 4 in a side view, differs by the shaping of guide plate 40. Thin areas 41,44 on the side of system carrier 1 are designed differently than thin areas 42,43 on the side of balance-scale support part 2: Thin areas 41,44 are slightly wedge-shaped, so that the thinnest area is close to system carrier 1; thin areas 42,43 are symmetrically designed and comprise an additional removal of material 47,48 in the middle so that an especially thin area is created in the middle. A fine adjustment of the parallelism of the guide rod struts is possible by means of a somewhat different depth of groove 47 on the top and on the bottom.

Moreover, central stiffer area 45,46 of the guide rod struts is not symmetrical to the connecting line of the two thin areas 41,42 and 43,44. Fastening screws 49,50 for the fastening of guide rod palate 40 to system carrier 1 are also arranged asymmetrically: Upper screw 49 is located approximately in the extension of thin area 41 but lower screw 50 is not. All these asymmetries permit the corner load behavior of the balance to be influenced and optimized.

Figure 5:
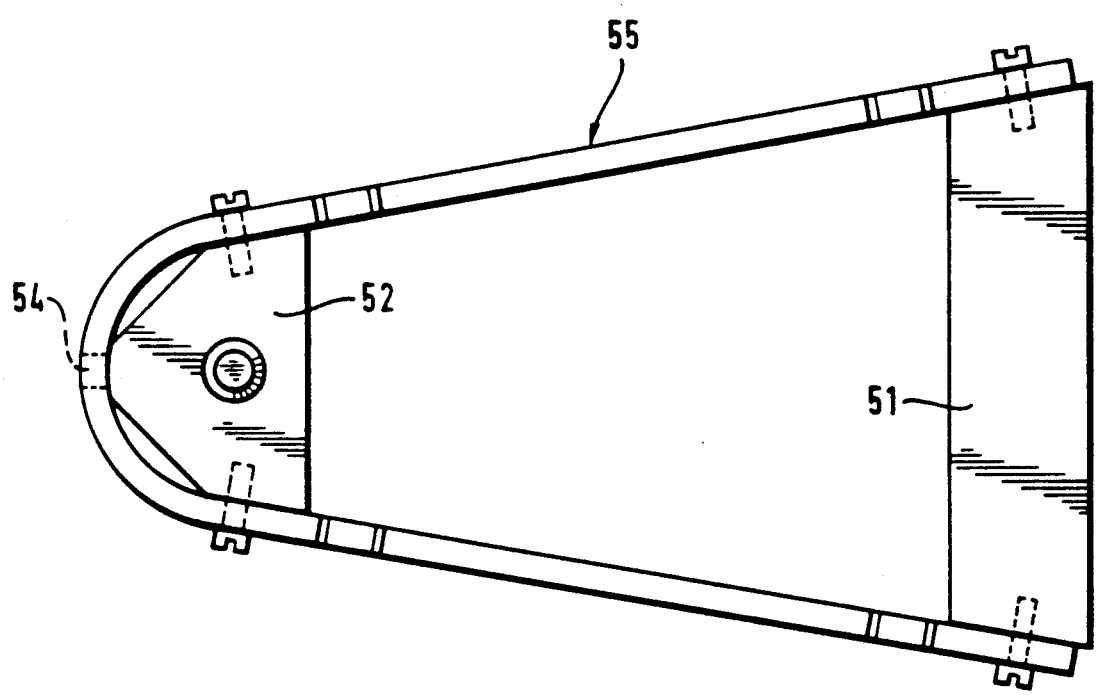
FIG. 5 shows a top view of the balance in a fourth embodiment.

In the embodiment shown in a top view in FIG. 5, the two guide rod plates and therewith all four guide rod struts are combined to a single part 55. This part 55 is bent with a vertical bending axis around balance-scale support part 52. Part 55 can extend out on the side of system carrier 51, as shown in FIG. 5, or it can also extend in a curve in order to increase stability. In addition, it is possible in a balance with translation lever and with a coupling element between the translation lever and balance-scale support part 52 to also integrate the coupling element into part 55. This is indicated in FIG. 5 by dotted lines at 54.

what is claimed is:

1. In a balance with a system carrier fixed to a housing and with a balance scale support, said system carrier and said balance scale support being connected by a first and second connection means, each of said first and second connection means including an upper strut and a parallelly disposed lower strut, said upper and lower struts being connected at each end thereof to first and second guide rod plates, each of said first guide rod plates being affixed by screws to said system carrier and each of second guide rod plates being affixed by screws to said balance-scale support wherein the improvement comprises in that the system carrier and the balance-scale support each have a wedge shaped configuration and each are horizontally dimensioned whereby the said affixed first guide rod plates are further apart than said affixed second guide rod plates whereby the system carrier, the struts and the balance-scale support describe a trapezoid when viewed from the top, the position of the screws of the first guide rod plates being different from the position of the screws of the second guide rod plates, and each of the struts promixate the first guide plates have first areas of reduced dimensions and each of the struts proximate the second guide plates have second areas of reduced dimensions, the first areas differing in reduced dimensions from the second areas and said areas being asymmetric with respect to said struts.

2. The balance according to claim 2 wherein the first guide rod plates include horizontally disposed slots between the upper and lower struts.

3. The balance according to claim 2 wherein the second area of reduced dimension is thinner than the first area of reduced dimensions.

4. The balance according to claim 3 wherein each of the upper struts are integrally connected by a bent portion at the balance-scale support.

5. The balance according to claim 4 wherein the bent portion is attached to the balance-scale support.

* * * * *